United States Patent Office 2,837,554
Patented June 3, 1958

2,837,554
PRODUCTION OF ISOCYANATES

Alois Gemassmer, Koln-Stammheim, Germany, assignor to Farbenfabriken Bayer Aktiengesellschaft, Leverkusen, Germany, a corporation of Germany No Drawing. Application March 25, 1954
Serial No. 418,761

Claims priority, application Germany March 27, 1953

4 Claims. (Cl. 260—453)

This invention relates to an improvement in the production of isocyanates.

It is well known to produce organic isocyanates by reacting amines with phosgene. This reaction is usually carried out in two steps (see W. Siefken, Liebigs Annalen der Chemie, volume 562 [1949], page 96 et seq.): In the first stage, the so-called "cold phosgenation," a solution or suspension of the amine and a salt of the amine (hydrochloride, carbonate), respectively, in an inert solvent is caused to react with phosgene or with a solution of phosgene in an inert solvent. In the second stage, the so-called "hot phosgenation," the reaction mixture formed in the cold phosgenation is heated to temperatures within the range of 100 to 200° C. while introducing phosgene to thereby finish the phosgenation.

In the cold phosgenation a paste-like mass consisting of a mixture of carbamyl chloride and amine hydrochloride is formed. To carry out the hot phosgenation this mass must be heated from a temperature around 0° C. to a temperature within the range of 100 to 200° C.

In accordance with the known methods this heating is effected indirectly, i. e. through the walls of the reactor. The reaction mass having a poor thermal conductivity, care had to be taken to ensure that the whole mass was uniformly heated by vigorously stirring. The temperature of the walls of the reactor had to be maintained at a level not too high above the reaction temperature since otherwise the portions of the mass which came into contact with the walls would have been overheated. Therefore, comparatively long heating periods were necessary. A further disadvantage was that the reactor had to be made of expensive high-grade alloy steels which combine resistance to corrosion with a good thermal conductivity.

The difficulties encountered in the heating of the reaction mass became very serious when attempts were made to replace the discontinuous mode of operation with a continuous process. Indeed, it was possible to accomplish an indirect heating by equipping the reactor with agitators and by using special heating elements, such as heating coils, but such equipment had to be made of expensive high-grade alloy steels. Another mode of operation, which was contemplated, included passing the reaction mass through a system of tubes having a small diameter and being provided with means for changing the direction of flow so as to ensure intimate mixing and good heat exchange. This mode of operation, likewise, was costly and troublesome, all the more since plugging of the tube system very often caused a shut-down of the phosgenation unit.

It is an object of the present invention to obviate the disadvantages of the known phosgenation methods. Another object is to provide an improved process for the production of organic isocyanates which may be carried out on a large scale. Still other objects will appear hereinafter.

It has now been found that the heating of the reaction mass obtained in the cold phosgenation may advantageously be effected by blowing vapor of the solvent used in the phosgenation through said reaction mass.

The vapor required for carrying out the process in accordance with the invention may be generated in a boiler of any suitable type or by passing the liquid to be evaporated through a heated pipe or coil such as a pipe still or evaporator coil. The generation of the vapor in a pipe or coil has the advantage that it may be effected uninterruptedly by continuously feeding the solvent to the evaporator by means of a suitable pump.

The solvent vapor is preferably depressured only shortly before entering the phosgenation reactor in order to prevent the reaction mass from entering into the vapor inlet tube. If a pipe still or evaporator coil is employed this precaution is unnecessary as the volume of the same is comparatively small.

The contact of the vapor with the reaction mass being very intimate, the manner in which the vapor is introduced into the reactor does not play any decisive part. Thus, the vapor may be introduced into the phosgenation reactor in any suitable manner, for example through one or several jets.

The solvent used for the generation of the vapor need not be pure.

A preferred embodiment of the invention comprises using for the generation of the vapor the condensate formed by condensing the hot exit gases from the hot phosgenation reactor. This mode of operation has the advantage that the concentration of the reactants is not changed.

The process of the invention is not restricted to the use of vapor alone for heating the reaction mass but may be combined with the conventional indirect heating through the walls of the reactor. In this case the amount of heat which has to be introduced through the walls of the reactor is comparatively small so that the use of special equipment, such as heating coils and preheaters may be dispensed with.

The invention makes it possible to considerably shorten the reaction time heretofore required for the phosgenation so that an increase in the efficiency of the plant is achieved. A further advantage of the process of the invention is that deposits on the walls of the reactor, which were encountered particularly in the phosgenation of diamines, are avoided.

The invention is further illustrated, but not restricted, by the following examples in which parts and percent are by weight:

Example 1

Equal volumes of a 30 percent solution of $\alpha$-naphthylamine in chlorobenzene and of a 25 percent solution of phosgene in chlorobenzene are introduced via separate conduits into a centrifugal pump and intimately mixed therein according to the process described in my co-pending application Serial No. 418,762 filed March 25, 1954. Into the delivery branch of the pump there are introduced 0.2 part of chlorobenzene vapor per 1 part of reaction mixture whereby the temperature is raised to about 120° C. The reaction is completed by passing the heated mixture along with phosgene through a tower. On removal of the excess phosgene by blowing with nitrogen the solution is distilled. Yield: 98% of $\alpha$-naphthylisocyanate. There was no plugging of the pump and the pipes for several weeks.

Example 2

In a 250 liter vessel there are placed 90 parts of chlorobenzene and 30 parts of liquid phosgene at a temperature of —10° C. 45 parts of $\alpha$-naphthylamine in 90 parts of chlorobenzene are added over a period of 5 minutes while stirring. During the addition of the amine the reaction mass gets thickish and when the addition is complete the mass has become so thick that it can no longer be stirred. Through an evaporator coil 30 parts of chlorobenzene are evaporated and the vapor is passed into the reaction vessel via an inlet tube. The contents of the vessel is thereby uniformly and rapidly heated to 120° C. without local overheating and made mobile. Distillation yields: 80% of α-naphthylisocyanate based on α-naphthylamine.

*Example 3*

Equal volumes of a 50 percent solution of p-phenetidine in chlorobenzene and of a 35 percent solution of phosgene in chlorobenzene are continuously introduced via separate conduits into a centrifugal pump in accordance with the process described in my co-pending application Serial No. 418,762, filed March 25, 1954. Into the delivery branch of the pump there is fed such an amount of chlorobenzene that the reaction mixture is heated to about 110° C. The phosgenation is completed at this temperature while introducing phosgene in a tower. Yield of p-ethoxy-phenylisocyanate: 97% based on p-phenetidine. Plugging of the pump and the conduits does not occur.

*Example 4*

A 20 percent solution of 1.4-diaminocyclohexane in chlorobenzene and an equal amount of a 40 percent solution of phosgene in chlorobenzene are continuously contacted. Into the reaction mixture there is introduced via a thin inlet tube such a proportion of chlorobenzene vapor that the temperature of the mixture rises to about 120 to 125° C. Thus, the mixture becomes mobile. The phosgenation is completed in a tower while introducing phosgene. Distillation of the reaction solution yields about 85% of cyclohexane-1.4-diisocyanate.

*Example 5*

Equal volumes of a fine suspension of 20 parts of "tolamin" (equal mixture of 20 to 30 percent of 1-methyl-2.6-diamino-benzene and 70 to 80 percent of 1-methyl-2.4-diamino-benzene) in 100 parts of o-dichlorobenzene and of a solution of 50 parts of phosgene in 100 parts of o-dichlorobenzene are mixed in a centrifugal pump. The reaction mixture is heated to about 140° C. by introducing o-dichlorobenzene vapor into the delivery branch of the centrifugal pump. Thus, there is obtained a mobile turbid liquid which by introducing phosgene at 140° C. gets clear. Distillation of the solution yields about 85% of diisocyanatobenzene.

I claim:

1. In the process for the production of organic isocyanates in which an amine is reacted with phosgene in a first step to form carbamyl chloride and in which the reaction mixture from the first step is heated to a temperature of between about 100 to 200° C. in a second step to form the isocyanate, the improvement which comprises at least partially effecting said heating by passing the hot vapors of an inert solvent through the reaction mixture from the first step.

2. Improvement according to claim 1, in which the reaction between the amine and the phosgene in the first step is effected in the presence of an inert solvent, which solvent is the same as the inert solvent used for the heating.

3. Improvement according to claim 1, in which the vapors of the inert solvent used for the heating are formed by evaporating the condensate formed by condensing the hot exit gases from the second step.

4. Process for the production of organic isocyanates which comprises contacting an organic solvent solution of an amine with an organic solvent solution of phosgene, heating the reaction mixture thus obtained to a temperature ranging from about 100 to 200° C. by passing the hot vapors of an inert solvent therethrough, and completing phosgenation by introducing phosgene at a temperature within said range.

References Cited in the file of this patent

UNITED STATES PATENTS

| | | |
|---|---|---|
| 2,319,057 | Hanford | May 11, 1943 |
| 2,480,089 | Slocombe et al. | Aug. 23, 1949 |
| 2,680,129 | Flores | June 1, 1954 |
| 2,683,160 | Irwin | July 6, 1954 |

FOREIGN PATENTS

| | | |
|---|---|---|
| 462,182 | Great Britain | Mar. 3, 1937 |
| 516,293 | Canada | Sept. 6, 1955 |